US007250914B2

(12) United States Patent
Kish et al.

(10) Patent No.: US 7,250,914 B2
(45) Date of Patent: Jul. 31, 2007

(54) COMPOSITE ANTENNA FOR A TIRE

(75) Inventors: James Christopher Kish, Akron, OH (US); Thomas Walter Starinshak, Wadsworth, OH (US); Joseph Carmine Lettieri, Stow, OH (US); Stephen John Babbo, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 4 days.

(21) Appl. No.: 10/902,981

(22) Filed: Jul. 30, 2004

(65) Prior Publication Data
US 2006/0022879 A1 Feb. 2, 2006

(51) Int. Cl.
*H01Q 1/32* (2006.01)
(52) U.S. Cl. ............... 343/711; 343/713; 343/717
(58) Field of Classification Search ........ 343/711, 343/717
See application file for complete search history.

(56) References Cited
U.S. PATENT DOCUMENTS

| 4,240,486 A * | 12/1980 | Schmit et al. ........... 152/152 |
| 4,343,343 A * | 8/1982 | Reuter ..................... 152/556 |
| 5,376,118 A * | 12/1994 | Kaplan et al. ........... 623/23.72 |
| 6,331,838 B1 | 12/2001 | Scott et al. ............... 343/715 |
| 6,885,111 B2 * | 4/2005 | Volpi ....................... 290/1 R |
| 2004/0016488 A1 * | 1/2004 | Benedict et al. ......... 152/152.1 |
| 2004/0017321 A1 * | 1/2004 | Benedict et al. ......... 343/741 |
| 2004/0159383 A1 * | 8/2004 | Adamson et al. ........ 152/152.1 |
| 2005/0132789 A1 * | 6/2005 | Starinshak ............... 73/146 |
| 2005/0132790 A1 * | 6/2005 | Starinshak ............... 73/146 |
| 2005/0133131 A1 * | 6/2005 | Starinshak ............... 152/152.1 |
| 2005/0133132 A1 * | 6/2005 | Girard et al. ............ 152/152.1 |

FOREIGN PATENT DOCUMENTS

GB 2156592 10/1985
WO 9929523 6/1999

* cited by examiner

*Primary Examiner*—Trinh Vo Dinh
(74) *Attorney, Agent, or Firm*—Richard B. O'Planick

(57) ABSTRACT

A composite antenna and method for tire monitoring systems is configured as a core composed of polymeric material and a conductive metallic layer in intimate surrounding contact with the core. The polymeric material provides elasticity to the core to enable the core to elongate when subjected to stress forces within a tire. The conductive layer is fabricated from a low impedance material and may be configured as a composite wherein an inner base metal is selected as a strength member and an outer metallic layer is applied to the base for electrical performance enhancement.

32 Claims, 2 Drawing Sheets

COMPOSITE ANTENNA FOR A TIRE

FIELD OF THE INVENTION

The invention relates generally to an apparatus, including an antenna and a transponder, for a tire pressure monitoring system and, more specifically, to a composite antenna for incorporation into a tire pressure monitoring system.

BACKGROUND OF THE INVENTION

It is common to employ apparatus, including an antenna, for electronically transmitting tire or wheel identification or other data at radio frequency. The apparatus includes a radio-frequency transponder comprising an integrated circuit chip having data capacity at least sufficient to retain identification information for the tire or wheel. Other data, such as the inflation pressure of the tire or the temperature of the tire or wheel at the transponder location, can be transmitted by the transponder along with the identification data.

It is known in the art to employ an annular antenna to transmit, at radio frequencies, data from a transponder contained within the structure of a tire or tire and wheel assembly. The antenna comprises a wire or strands of wire formed into a loop that may be sheathed in an extruded covering formed from a suitable material such as plastic. The plastic sheath in combination with the antenna form a unitary body that may be affixed to a green tire in a pre-build assembly process or attached to a finished tire in a post-cure operation. While the antenna and transponder may be incorporated into a tire during "pre-cure" manufacture, in practice it is very difficult to do this. Both radial ply and bias ply tires undergo a substantial diametric enlargement during the course of manufacture. Bias ply tires are expanded diametrically when inserted into a curing press, which typically has a bladder that forces the green tire into the toroidal shape of the mold enclosing it. Radial ply tires undergo diametric expansion during the tire building or shaping process and a further diametric expansion during the course of curing. Any annular antenna and the electronic circuitry associated therewith built into the tire must be able to maintain structural integrity and the mechanical connection between the antenna and transponder package during the diametric enlargement of the tire during its manufacture. Once assembled into the tire, any detected malfunction in the antenna, transponder, or antenna to transponder connection that cannot be repaired destroys the utility of the tire and may necessitate a scrapping of the tire. Hence, placement of an annular antenna-transponder assembly into a tire during its manufacture carries risk that subsequent failure or breakage of assembly components will necessitate the destruction of the otherwise suitable host tire. Regardless of their position within the tire, annular antennas must therefore be able to survive the constant flexing a tire sees in service. This is true for antennas mounted to the inside of a tire's cavity or for antennas cured within the tire's structure.

Not only is the risk of damage to an annular antenna-transponder system present during its incorporation into a tire during manufacture, but damage to such systems are not uncommon from operation of the tire on a vehicle. Loop antennas and the electronics associated therewith are subjected to substantial compressive strain and at the sidewall a high strain amplitude. Such locations represent high load and deformation to regions of the tire. Consequently, antenna, transponders, and the connections therebetween in such locations are prone to breakage and mechanical or electrical failure.

The electrical as well as mechanical characteristics of an antenna are equally important and an antenna that provides satisfactory electrical capability without sacrificing mechanical performance has proven difficult to achieve. Some tire pressure monitoring systems are battery-less and rely on an external power source to power the microprocessor. These systems have complex electrical needs since the antenna must not only transmit a RF signal that reflects the tire's air pressure, but also receive a RF signal that can be turned into power for the microprocessor to operate. There are multiple factors that can negatively affect the antenna's ability to deliver power. Among others, such factors include the distance between the antenna and vehicle mounted transponder; magnetic field distortion caused by the rim; the size of the transformer used near the microprocessor; and the temperature of the tire. Because of these factors and others, it is imperative that the intrinsic electrical impedance of the antenna be kept to a minimum.

There is, accordingly, a continuing need for an antenna apparatus suitable for incorporation into a tire either in a pre-cure or post-cure procedure. The antenna apparatus must provide sufficient structural integrity to withstand the stresses attendant tire building processes and post-manufacture use on a vehicle. Moreover, the antenna apparatus ideally will maintain its optimal, intended configuration and shape throughout the tire build operation and subsequent use on a vehicle. Since the performance of the tire pressure monitoring system is dependent upon efficient communication between the tire electronics and a remote reader via the antenna, maintaining the antenna in an optimal configuration is highly desirable. Finally, it is important that any suitable antenna provide low impedance and meet the electrical requirements of the system without sacrificing robust mechanical performance.

SUMMARY OF THE INVENTION

The subject invention overcomes the deficiencies in known antenna systems and methods for tire monitoring systems by utilizing a composite that can meet the electrical and mechanical requirements discussed previously. The composite comprises a polymeric material and a metallic material in intimate contact with each other. The polymeric material serves as the core for the placement of the metallic material over and can have several alternative forms.

A metallic material is placed around the core and comprises a conductive layer. The conductive layer transmits the electrical current and may, in one aspect of the invention, take the form of one or more metal filaments wound around the core. The material or materials from which the antenna conductive layer is fabricated provides, pursuant to the invention, low impedance (high conductivity). The conductive layer may be formed from a combination of ferrous and non-ferrous materials in a composite configuration. In one aspect of the invention, a higher strength material may be selected for use as a conductive layer core and a shell of more conductive material formed to surround the core. Other, non-conductive coatings in the conductive layer may be employed to insulate filaments of the conductive layer in order to reduce "skin effect" detrimental to the antenna's electrical performance.

Pursuant to another aspect of the invention, a tire may be combined with an antenna of the type summarized above.

The method for configuring the antenna further comprises yet another aspect of the invention.

DETAILED DESCRIPTION OF THE INVENTION

Figure 1:
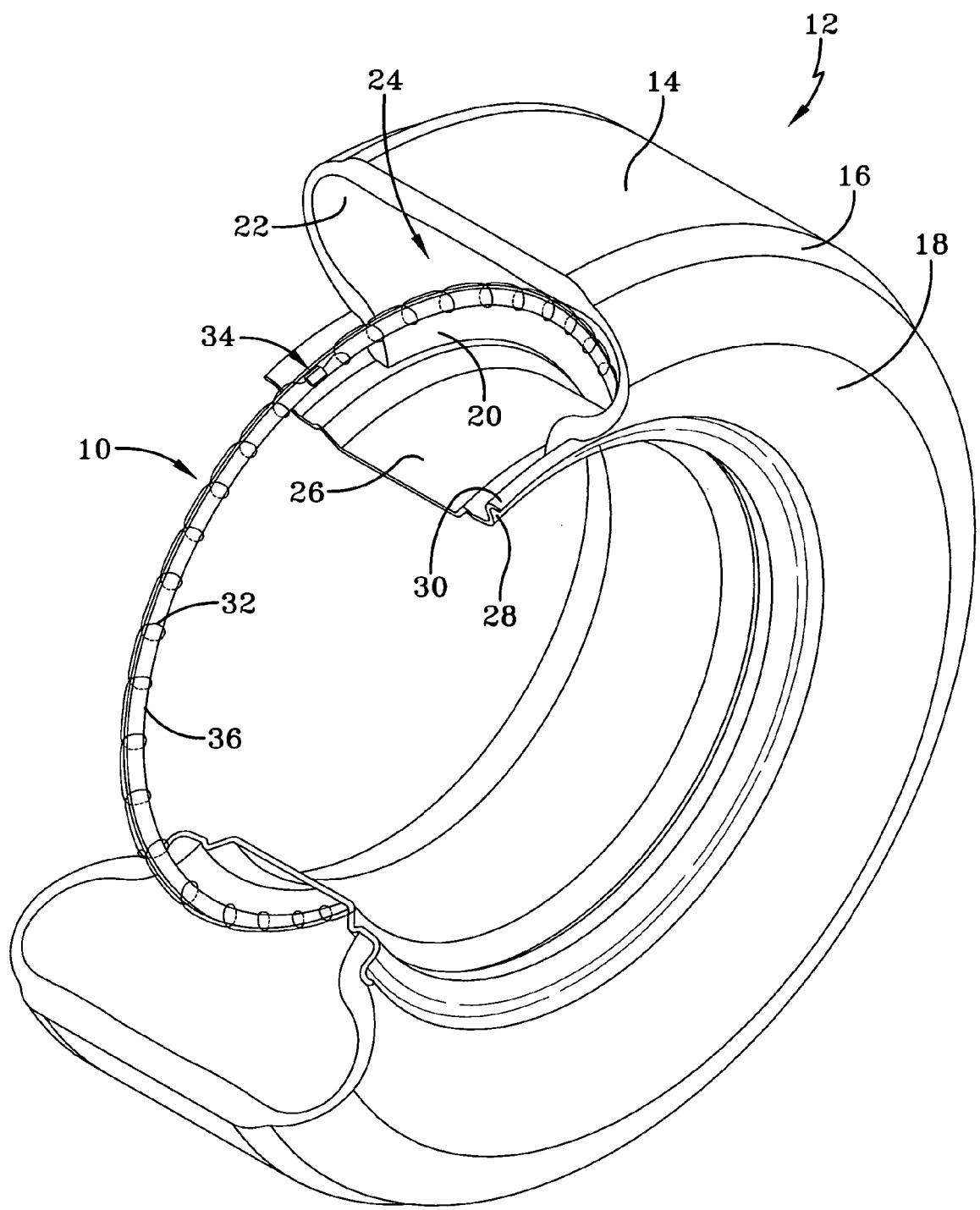
FIG. 1 is a perspective view of a tire and the subject annular apparatus with portions of the tire removed for the purpose of illustration.

A tire pressure monitoring system typically consists of a transponder having one or more sensors. The transponder and associated electronics are housed within a package. In order to send or receive RF signals, a transponder must have an antenna. The antenna is preferably annular in configuration in the subject invention but may have alternative shapes if desired. The antenna may either be incorporated into the tire during manufacture or affixed to the tire by way of a post manufacture procedure. As used herein, an "annular antenna" may be circular, oblong, symmetrical, or asymmetrical without departing from the subject inventive principles. However, the preferred configuration of the antenna is circular and sized to overlap the tire sidewall region to which it attaches. The preferred location is the sidewall, but upper sidewall or crown placement is also possible. Various commercially available transponders, sensors, and other electrical devices may be deployed in combination with an antenna formed pursuant to the principles of the subject invention Referring initially to FIG. 1, a preferred embodiment 10 of an annular assembly is shown deployed within a tire 12. The tire 12 is formed from conventional materials such as rubber or rubber composites by conventional means and may comprise a radial ply or bias ply configuration. A typical tire 12 is configured having a tread 14, a shoulder 16, an annular sidewall 18, and a terminal bead 20. An inner liner 22 is formed and defines a tire cavity 24. The tire 12 is intended for mounted location upon an annular rim 26 having a peripheral rim flange 28 and an outer rim flange surface 30. Rim 26 is conventionally configured and composed of a suitably strong metal such as steel.

Figure 2:
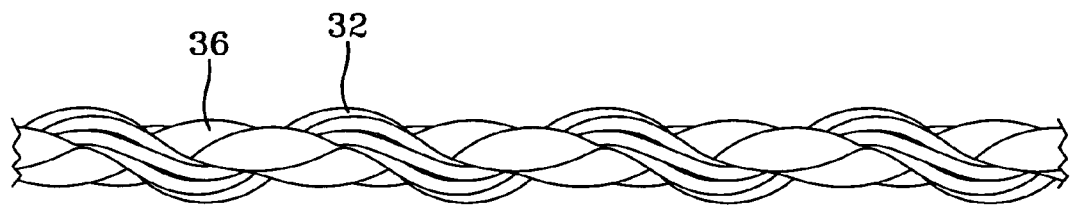
FIG. 2 is an enlarged schematic view of a portion of a first embodiment antenna apparatus pursuant to the invention.

With reference to FIGS. 1 and 2, the assembly 10 comprises an outer conductive antenna layer 32 electrically connected to a transponder 34 and at least partially surrounding and in intimate contact with an antenna inner core 36. As used herein, the term "composite" refers to the combination of a polymeric core material and a metallic conductive layer material in intimate contact with each other. The core 36 is formed at least partially from a polymeric material and the conductive material forms the conductive layer 32 over the core 36. The core 36 is herein defined as that material which primarily resides in the center of the antenna and is preferably but not necessarily generally rounded in cross-section. Other forms for the core may be devised within the contemplation of the invention. The core 36 may further consist of one single, noodle-like structure, commonly referred to in the industry as o-ring cord stock. Alternatively, the core 36 may also be comprised of twisted fibers of a polymeric material such as those used to make reinforcing fabrics. By twisting the fibers or yarns, single-ply or more, will increase their elongation properties. Suitable, but not limited to, fibers are polyester, nylon (6 or 6.6), PEN, and others.

Suitable polymers with which to fabricate the core 36 may be either naturally occurring or man-made. One large group of polymers that may be employed are thermoplastics and elastomers; however, the invention contemplates the use of any polymer or combination of polymers that substantially exhibits the properties suitable for the practice of the invention. It is desirable that any suitable material demonstrate a sufficiently large elongation to rupture in tensile test, preferably but not necessarily at least fifteen percent. In addition it is desirable that any suitable material for the core 36 have a sufficiently high breaking load, preferably but not necessarily at least one pound. The material should preferably also demonstrate high fatigue resistance to cyclic mechanical loads; a high material resistance to gaseous degradation; and be chemically inert to the metallic conductive layer that is intimate contact with it. It is further preferable that the antenna core 36 have a diameter of about five times the diameter of the metallic conductive layer surrounding it.

With continued reference to FIG. 1, a transponder module 34 of the general type described above is provided and may include means for sensing tire parameters such as pressure and temperature. In the post manufacturing state, the apparatus 10 comprising antenna conductive layer 32, transponder module 34, and antenna core 36 is a unitary, preferably but not necessarily circular, assembly that is readily transportable and handled for attachment to tire 12. The diameter of the apparatus assembly 10 is a function of the size of the tire 12 and the preferred tire surface attachment location thereon. The composite antenna maintains the assembly 10 in its intended configuration prior to attachment to the tire inner liner by any suitable means. The apparatus 10 is affixed to liner 22 of the tire 12 either during manufacture of the tire or, as preferable, in a post-manufacture assembly operation. Attachment may be by means of an adhesive or the apparatus may be embedded into the tire itself during manufacture.

When situated in a tire and subjected to stresses and heat present within the tire, the antenna will elongate from an initial relaxed state into an extended state. A wavy, sinusoidal, or zigzag shape coupled with the material composition of the antenna conductive layer and core allows the antenna to elongate when subjected to tire stresses without breakage. When released from the influence of tire stress, the elastic construction of the antenna core will recover and contract to the original, optimal and intended shape.

Figure 3:
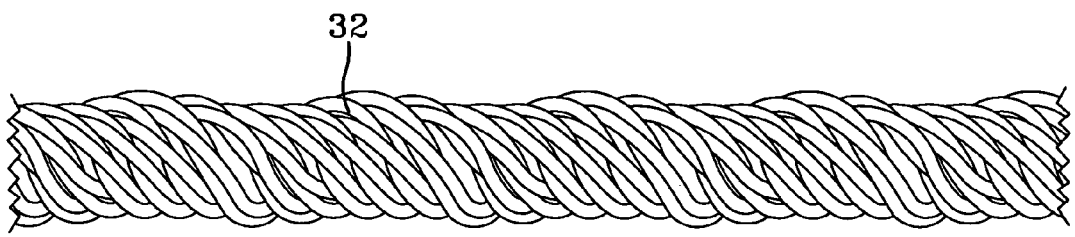
FIG. 3 is an enlarged schematic view of a portion of a second alternative embodiment of an antenna apparatus pursuant to the invention.
Figure 4:
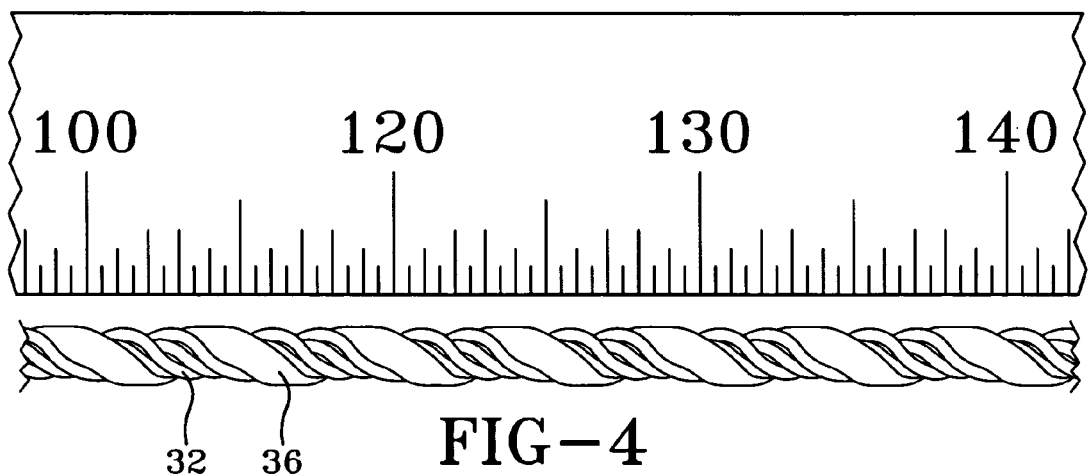
FIG. 4 is a perspective view of the first embodiment of an antenna showing general dimensional scaling.
Figure 5:
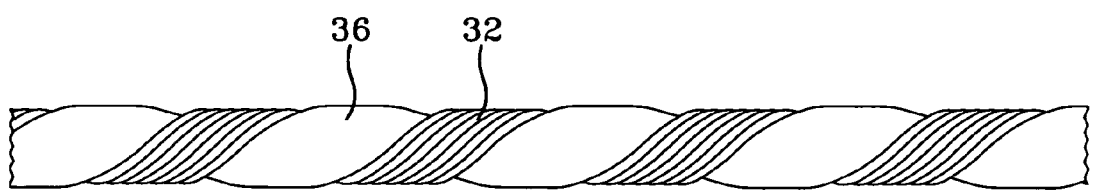
FIG. 5 is an enlarged schematic view of a portion of a third alternative embodiment of an antenna apparatus pursuant to the invention.

The conductive layer 32 functions to transmit electrical current and may take the form of one or more single metal filaments helically wound around the core in a uniform fashion as shown in FIG. 5. Alternatively, the conductive layer 32 may comprise one or more pre-twisted wire bundles helically wound around the core as shown in FIGS. 2 and 3.

The conductive layer 32 may be formed from many different types of metallic materials available in the industry such as, but not limited to, copper derived alloys. Acceptable materials for the wire include steel, aluminum, copper, copper alloys or other electrically conducting wire. The diameter of the conductive layer 32 is not generally considered critical for operation as an antenna. A sinusoidal, or zigzag form of the antenna is useful in providing flexibility and minimizes the risk of breakage during manufacture and use. Suitable metallic material with which to form the antenna conductive layer 32 preferably will demonstrate a high ductility after formation over the core 36. Such material will further demonstrate high fatigue resistance to cyclic mechanical loads of the type and magnitude experienced in a tire environment. Moreover, the material forming the conductive layer 32 will preferably have low electrical impedance at the system's operating radio frequency; low temperature coefficient of resistance; and comprise no environmentally hazardous elements. The core 36 has a longitudinal axis and the conductive layer 32 intersects the core axis at an intersection angle. Such an angle is preferably relatively small so that the conductive layer wraps around the core generally in the same direction as the core axis. The core 36 also may be allowed to wander or deviate from absolute straight. As shown in FIG. 2, the core 36 undulates under the forces imposed upon it by the conductive layer 32.

The aforementioned low impedance antenna is of particular utility in an annular configuration to transmit and receive signals from a transceiver. The lower the impedance the antenna has, the further the transponder can be placed from the tire. The subject conductive layer 32 may be formed using non-ferrous elements that provide enhanced conductivity. Alternately, combinations of iron and non-ferrous materials may be employed in a composite structure. Copper or copper based alloys such as Percon 19 may be utilized. Percon 19 is a copper based alloy manufactured and commercially available from Fisk Alloy Conductors, located at Hawthorne, N.J. Copper based alloys offer higher strength than pure copper without sacrificing conductance to an unacceptable degree.

Other materials suitable are those that utilize a higher strength material such as steel for the conductive layer base material and a more conductive material such as copper or a copper alloy around the base material. The antenna conductive layer may further be used with a thin conductive electroplated coating such as but not limited to tin, gold, or silver. The coating can aid in soldering the conductive layer to the transponder terminals and also prevent the base material from corroding.

In addition to the use of conductive coatings, non-conductive coatings may be employed for coating the conductive layer 32. One such coating is polyurethane. Such a coating can be applied to a conductive base material. For a conductive layer that is made up of many fine filaments rather than a solid conductor, insulating each filament reduces what is commonly called the "skin effect". The skin effect is detrimental to an antenna's performance and occurs when all of the conductors in the antenna conductive layer are not utilized equally; i.e. the inner areas of the antenna conductive layer are not contributing as effectively as the outer.

The combination of a low impedance outer conductive layer with a flexible polymeric inner core provides significant advantageous mechanical and electrical properties. The antenna is flexible and yet provides good conductivity. By way of example, without limiting the use of substitute materials, an antenna may be configured having a core 36 formed at least partially from Nylon 6.6, two ply yarn (thermoplastic) and a conductive layer 32 of 1+6×0.175 mm, Percon 19 (pretwisted as in FIG. 2). Another composite may be formed using a core 36 formed at least partially from Polyester, two ply yarn (thermopastic) and a conductive layer of 6 pretwisted bundles of 3×0.175 mm, Percon 19 as shown in FIG. 3. An alternative composite antenna may be formed using a core 36 formed of SBR, carbon black filled (elastomer) and a conductive layer 32 of (7) 0.175 mm, Percon 19 (single layer as shown in FIG. 5).

While the above sets forth a preferred embodiment and alternative embodiments of the subject invention, the invention is not intended to be so limited. Other embodiments that will be apparent to those skilled in the art and which utilize the teachings herein set forth, are intended to be within the scope and spirit of the present invention.

What is claimed is:

1. A composite antenna for attachment to an inner liner of a tire comprising:
   an elongate core formed at least partially from a polymeric material;
   an elongate conductive layer placed at least partially around the core, the antenna being capable of flexibly deforming through reciprocal elongation and contraction in reaction to stresses within the tire, wherein the core comprises a plurality of side-by side disposed bodies composed at least partially of said polymeric material and forming a bundle, the core bodies flexibly reciprocally elongating from an initial relaxed state into an extended state in reaction to stresses within the tire, and contracting from the extended state returning to an original, optimal and intended shape when released from the influence of the tire stress, and flexibly radially deforming into an undulating configuration under forces imposed by the conductive layer.

2. An apparatus according to claim 1, wherein the core polymeric material is capable of at least fifteen percent elongation to rupture.

3. An apparatus according to claim 2, wherein the core is formed from a relatively high fatigue resistance to mechanical loads and gaseous degradants.

4. An apparatus according to claim 1, wherein the core polymeric material is chemically inert to the composition of the conductive layer.

5. An apparatus according to claim 1, wherein the core has a diameter dimensioned at least three times a sectional dimension of the conductive layer.

6. An apparatus according to claim 1, wherein the core is composed of nylon 6.6 two ply thermoplastic yarn.

7. An apparatus according to claim 1, wherein the core is composed of polyester two ply thermoplastic yarn.

8. An apparatus according to claim 1, wherein the core is composed of rubber stock.

9. An antenna according to claim 1, wherein the conductive layer is composed of a base metal having a relatively high tensile strength and a coating material covering the base metal.

10. An antenna according to claim 9, wherein the coating material is a relatively low impedance conductive metal.

11. An antenna according to claim 1, wherein the conductor layer is at least partially formed from a material selected from a group comprising (16×0.175 mm Percon 19; 1+3×0.175 mm Percon 19) material.

12. An antenna according to claim 1, wherein the core is at least partially formed from nylon 6.6 two ply thermoplastic yarn.

13. A tire having an antenna assembly incorporated therein, the tire comprising:
   a tire body having an inward facing wall;
   an elongate composite antenna affixed to the tire body wall and comprising a core formed at least partially from a polymeric material capable of reciprocal elongation from an initial relaxed state into an extended state when subjected to tire stress, and contraction from the extended state returning to an original, optimal and intended shape when released from the influence of the tire stress, and a conductive layer extending at least partially around the core, wherein the core polymeric material is capable of at least fifteen percent elongation to rupture.

14. A tire according to claim 13, wherein the core polymeric material is at least partially nylon yarn and the conductive layer is composed at least partially of Percon 19 metal.

15. A method for mounting an elongate composite antenna and transponder to a tire, comprising the steps:

providing an elongate composite antenna comprising a core formed at least partially from a polymeric material capable of reciprocal elongation from an initial relaxed state to an extended state when subjected to stresses within the tire, and contraction from the extended state returning to an original, optimal and intended shape when released from the influence of the tire stress, and a conductive layer extending at least partially around the core;

attaching the composite antenna to an inward wall of a tire.

16. A method according to claim 15 wherein the core is composed of a conductive rubber composition.

17. A method according to claim 15 comprising the further step of forming the core at least partially from a nylon material and the conductive layer at least partially of Percon 19 metal.

18. A flexible composite conductor assembly comprising:

an elongate core formed at least partially from a polymeric material;

an elongate conductive layer placed at least partially around the core, the conductor assembly being capable of flexibly deforming in reaction to stresses, wherein the core comprises a unitary elongate body composed from said polymeric material, the unitary elongate body flexibly reciprocally elongating from an initial relaxed state into an extended state in reaction to stresses, and contracting from the extended state returning to an original, optimal and intended shape when released from the influence of the tire stress, and the elongate body resiliently radially deforming into an undulating configuration responsive to radial forces imposed upon the body by the conductive layer.

19. An assembly according to claim 18, wherein the core comprises a plurality of side-by side disposed bodies forming a bundle.

20. An assembly according to claim 19, wherein the core polymeric material is capable of at least fifteen percent elongation to rupture.

21. An assembly according to claim 20, wherein the core is formed from a relatively high fatigue resistance to mechanical loads and gaseous degradants.

22. An assembly according to claim 18, wherein the core is composed of a polymeric material that is chemically inert to the composition of the conductive layer.

23. An assembly according to claim 18, wherein the core has a diameter dimensioned at least three times a sectional dimension of the conductive layer.

24. An apparatus according to claim 18, wherein the core is composed of nylon 6.6 two ply thermoplastic yarn.

25. An assembly according to claim 18, wherein the core is composed of polyester two ply thermoplastic yarn.

26. An assembly according to claim 18, wherein the core is composed of rubber stock.

27. An assembly according to claim 18, wherein the conductive layer is composed of a base metal having a relatively high tensile strength.

28. An assembly according to claim 27, wherein the conductive layer is composed at least partially of a copper alloy.

29. An assembly according to claim 27 wherein the conductive layer comprises a coating material covering the base metal.

30. An assembly according to claim 29, wherein the conductive layer coating material is a relatively low impedance conductive metal.

31. An assembly according to claim 18, wherein the conductor layer is at least partially formed from a material selected from a group comprising (16×0.175 mm Percon 19; 1+3×0.175 mm Percon 19) material.

32. An assembly according to claim 18, wherein the core is at least partially formed from nylon 6.6 two ply thermoplastic yarn.

* * * * *